Jan. 10, 1967  E. P. BULLARD III  3,296,904
TOOL BLOCK
Filed July 1, 1964
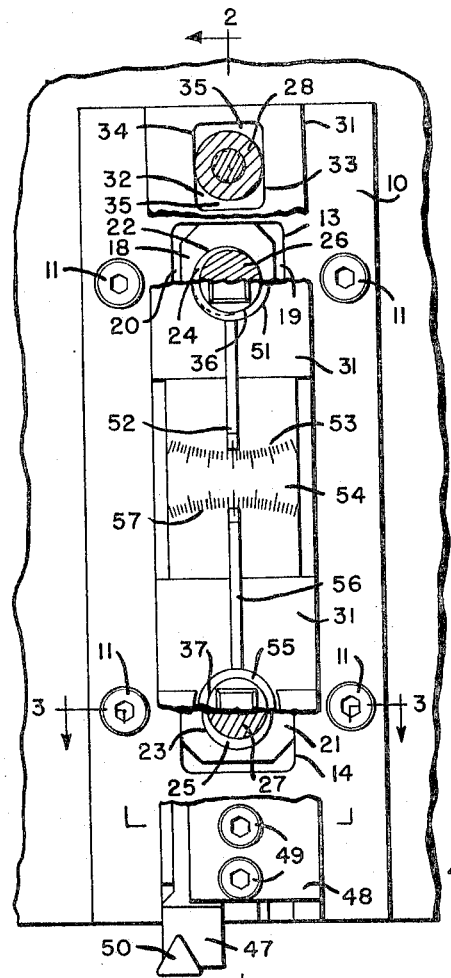
FIG. 1
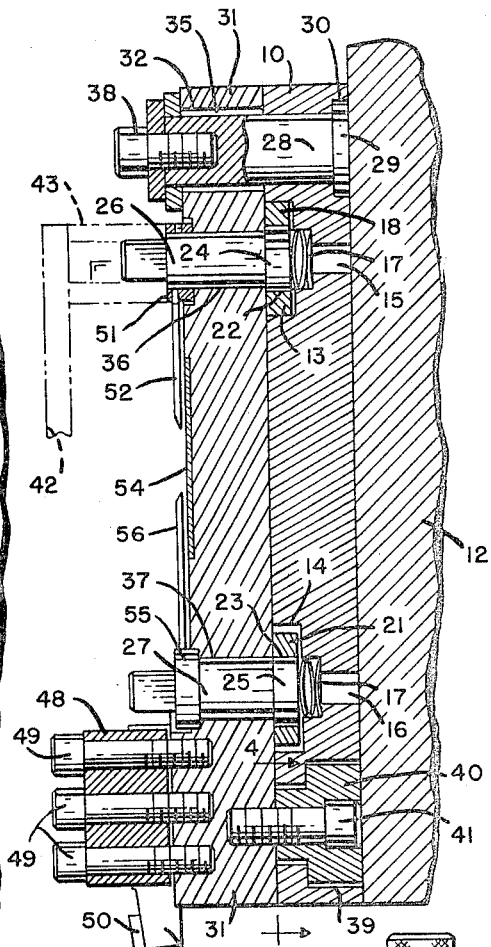
FIG. 2
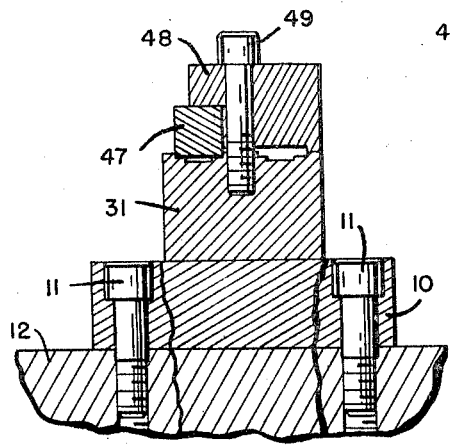
FIG. 3
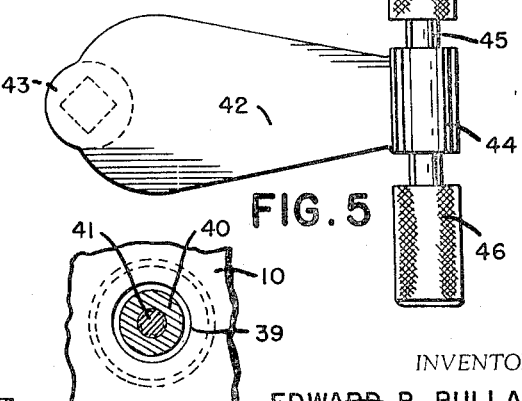
FIG. 4
FIG. 5
INVENTOR.
EDWARD P. BULLARD III
BY
ATTORNEY.

United States Patent Office 3,296,904
Patented Jan. 10, 1967

3,296,904
TOOL BLOCK
Edward P. Bullard III, Fairfield, Conn., assignor to The Bullard Company, Bridgeport, Conn., a corporation of Connecticut
Filed July 1, 1964, Ser. No. 379,645
8 Claims. (Cl. 82—36)

This invention relates ot machine tools, and particularly to an improved tool block for holding a cutting tool and having the capacity to very precisely adjust the cutting tip of the tool.

During the machining of metals, the cutting tips of tools become dull, requiring sharpening and adjustment to the precise location they originally obtained. Also, in cutting dense metals, deflection of the tool shank often requires precise adjustment of the cutting edge of the tool, particularly when precision work is being performed.

Heretofore, such adjustments required complex settings of gauge means on the machine tool to effect these adjustments, entailing substantial "down time" of the machine tool.

The principal object of the present invention is to provide a tool block for a cutting tool in which both axial and transverse precise adjustments of the cutting edge of the tool can be effected without requiring any substantial amount of "down time" of the machine tool to which it is attached.

Another object of the invention is to provide such a tool block in which separate eccentric means is employed to adjust the cutting edge of the tool both axially and transversely.

Still another object of the invention is to provide such a tool block in which the cutting edge of a tool can be precisely adjusted longitudinally without affecting its transverse position, and adjusted precisely transversely with a negligible effect on its longitudinal position.

In one aspect of the invention, a base member may be provided with fastening means for rigidly mounting it onto a saddle or slide of a machine tool. The base member, on its face opposite that lying against the slide or saddle, may be provided with longitudinally spaced, aligned, rectangular recesses for receiving rectangular shoe means. The dimensions of said recesses and shoes are such that two opposite edges of each shoe precisely fit two opposite edges of the corresponding recess, with the other two opposite edges of the shoe spaced a substantial distance from the other two opposite edges of the corresponding recess. The arrangement is such that the precisely fitting edges of the two recesses and shoes are at right angles relative to each other.

In another aspect of the invention, a pin may be mounted on the base member in aligned relation with the spaced recesses and spaced from the one.

In another aspect of the invention, each shoe may rotatably support a disc having an upstanding integral, eccentric post of cylindrical form and provided with a square end to receive a wrench.

In still another aspect of the invention, a tool supporting plate may include a rectangular passage therethrough that fits over the pin in the base member. The rectangular passage may be of such dimensions that its two longitudinally extending opposite walls precisely fit the pin, while the other two opposed walls are spaced from the pin walls. This makes it possible to pivot the tool supporting plate about the pin while permitting limited longitudinal movement of the plate relative to the pin.

In a further aspect of the invention, the tool supporting plate may also include longitudinally spaced, aligned holes for receiving the cylindrical, eccentrically arranged posts such that rotation of the post adjacent the pin causes longitudinal movement of the tool supporting plate which is permitted by the construction of the other recess and shoe; and rotation of the other post causes transverse movement of the tool supporting plate.

In a still further aspect of the invention, the tool supporting plate may be rigidly fastened to the base member, at a point below the eccentric post farthest from the pivot pin, by a fitting that permits limited transverse and longitudinal movement of the tool supporting plate relative to the base member.

In still another aspect of the invention, a tool may be rigidly fixed to the end of the tool supporting plate opposite that which cooperates with the pivot pin.

In another aspect of the invention, pointer means may be attached to each eccentric post, said pointer means cooperating with a scale on the tool supporting plate calibrated in thousandths of an inch of movement of the cutting tip of the tool.

In still another aspect of the invention, a wrench may be provided having a sliding hammer arrangement for turning each of the eccentric posts very accurately.

By virtue of the high mechanical advantage of the eccentric posts, the tool supporting plate can be moved relative to the base member even though they are bolted together in the manner above described.

The above, other objects and novel features of the invention will become apparent from the following specification and accompanying drawings which are merely exemplary.

In the drawings:

FIG. 1 is a front elevational view of a tool block to which the principles of the invention have been applied;

FIG. 2 is a sectional view taken substantially along line 2—2 of FIG. 1;

FIG. 3 is a sectional view taken substantially along line 3—3 of FIG. 1;

FIG. 4 is a sectional view taken substantially along line 4—4 of FIG. 2; and

FIG. 5 is a view of a wrench for use with the apparatus shown in the drawings.

Referring to the drawings, and particularly to FIGS. 1 and 2, a base member 10 may be rigidly attached by screws 11 to a member 12 such as a slide or saddle of a machine tool.

The base member 10 may include rectangular pockets or recesses 13 and 14 arranged in spaced, aligned relation, and bored and counterbored holes 15 and 16 for the reception of spring means 17 for a purpose to be described later. A rectangular shoe 18 may be mounted within recess 13, and its dimensions may be such that opposed edges precisely fit in a sliding manner, opposed edges of the recess 13, while the other opposed edges provide clearances 19 and 20 between shoe 18 and the other opposed edges of recess 13.

Another shoe 21 similar to shoe 18 is mounted in recess 14, but its arrangement is such that the precise, sliding contacting edges between the shoe 21 and recess 14 are at right angles to those of shoe 18 and recess 13. The shoes 18 and 21 may be provided with cylindrical recesses 22 and 23 for the reception of cylindrical discs 24 and 25. Posts 26 and 27 are integral with discs 24 and 25, and are eccentrically mounted thereon for a purpose to be described later.

A pivot pin 28 extends through the member 10 and is provided with a flange 29 that seats in a counterbore 30. A tool supporting plate 31 may include a rectangular passage 32 extending through it, and its dimensions are such that its opposed edges 33, 34 precisely fit the cylindrical wall of pin 28, while its other walls provide clearance 35 on each side of the pin 28. The arrangement is such that the plate 31 can pivot about pin 28 while still moving longitudinally a limited amount. Although pin 28 is shown above shoe 18, it can with equal facility be located between shoes 18 and 21.

The plate 31 may also include cylindrical holes 36, 37 adapted slidingly to receive posts 26 and 27. The construction is such that with the longitudinal centerlines of plate 31 and member 10 parallel, the posts 26 and 27 are in the positions shown in FIG. 1. Accordingly, rotary movement of post 26 will move plate 31 along its longitudinal axis, the clearances 35 and that between 21 and 14 permitting such movement; and rotary movement of post 27 will move plate 31 pivotally about pin 28, such being permitted by virtue of clearances 19, 20.

Plate 31 is frictionally held against the outer surface of member 10 by a screw 38 threaded into pin 28 which acts with flange 29 to securely hold the upper end of plate 31 frictionally against member 10. A bored and counterbored hole 39, in the lower end of plate 31, receives an undersized shouldered element 40 as well as a screw 41 passing through element 40 and threaded into plate 31. The undersize of element 40 permits both limited longitudinal and pivotal movement of plate 31.

With the screws 41 and 38 tightened, a rigid positive structure is provided, and the friction between plate 31 and member 10 can be overcome by turning posts 26 and 27 by means of a wrench 42. The wrench includes a socket 43 adapted to fit the square ends of posts 26 and 27. It also includes an arm portion at the end of which a sleeve 44 slidingly receives a rod 45 with knurled handles 46 thereon. The construction is such that fine movements of the posts 26, 27 can be effected by a hammering action between the heads 46 and the ends of sleeve 44. Since the arm of wrench 42 is of a substantial length and the eccentricities of the posts 26, 27 are substantially small, a very high mechanical advantage is possible to overcome the friction between plate 31 and member 10.

The plate 31 may have a tool 47 removably attached to it by a clamp 48 that is secured to plate 31 by bolts 49. The cutting tip 50 of tool 47 is set to a predetermined distance from the center of the disc 25, and the distance between the center of disc 25 and pivot pin 28 is also a predetermined dimension. These dimension govern the value of the eccentricity of the post 27 since transverse movement is occasioned by movement of plate 31 about pivot 28.

A collar 51 is fixed to post 26 and it includes a pointer 52 that cooperates with a scale 53 on a plate 54. Another collar 55 on post 27 supports a pointer 56 that cooperates with a scale 57 on plate 54. The scales 53 and 57 are calibrated in units of movement of the cutting tip 50 of tool 47, both in a longitudinal and transverse direction.

Although the various features of the improved tool block have been shown and described in detail to fully disclose one embodiment of the invention, it will be evident that changes may be made in such details and certain features may be used without others without departing from the principles of the invention.

What is claimed is:

1. In a tool block, a base; a tool support pivotally mounted on said base; a tool adjustably attached to said support; first rotatable eccentric means between said base and tool support for adjusting said tool support longitudinally of said base, guide means including a pivot pin for preventing transverse movement of said tool support during longitudinal adjustment thereof, second rotatable eccentric means between said base and tool support for pivoting said tool support relative to said base about said pivot pin to adjust said tool support transversely of said base; and pointer means connected to and rotatable with said eccentric means adapted to cooperate with scale means on said support for indicating the adjustment of said tool support.

2. In a tool block, a base; a tool support; pivot means pivotally mounting said tool support on said base; a tool adjustably attached to said support; first and second rotatable eccentric means between said tool support and base for respectively adjusting said support longitudinally and transversely of said base, said pivot means and said second eccentric means cooperatively preventing transverse movement of said support during longitudinal adjustment of the support by said first eccentric means; and pointer means connected to and rotatable with said eccentric means adapted to cooperate with scale means on said support for indicating the adjustment of said tool support.

3. In a tool block, a base member adapted to be attached to a slide of a machine tool; a pivot pin fixed to said base member; a tool support having an elongated slot adjacent one end thereof and a tool mounting end remote from said one end, said pivot pin being disposed in said slot, said slot having a transverse width which precisely fits said pivot pin for pivotal movement of said tool support thereabout, and a length which accommodates longitudinal movement of said tool support; spaced rectangular recesses in said base member; shoe means disposed in each of said recesses for sliding movement therein, one of said shoe means being restrained against longitudinal movement and the other against transverse movement relative to said base member; rotatable discs in each shoe means; and eccentrically mounted posts on said discs, said posts being journaled in said tool support, whereby oscillation of one of said posts produces longitudinal movement of said tool support relative to said base member without affecting its transverse position, and oscillation of the other post produces transverse movement of said tool support relative to said base member without substantially affecting the longitudinal position of the tool mounting end thereof.

4. The tool block set forth in claim 3 additionally including pointer means connected to each eccentrically mounted post for simultaneous angular movement therewith, and scale means adjacent a free end of each of said pointer means for indicating the units of longitudinal and transverse movement of said tool mounting end of said tool support relative to said base member as said tool support is respectively longitudinally and transversely adjusted by the oscillation of said posts.

5. The tool block set forth in claim 3 additionally including means for tightening said tool support against said base member.

6. The tool block set forth in claim 3 additionally including means threaded into said pivot pin for tightening said tool support against said base member.

7. The tool block set forth in claim 6 additionally including means separate from said threaded tightening means for tightening said tool support against said base member.

8. The tool block set forth in claim 3 wherein said shoe means restrained against longitudinal movement relative to said base member is disposed adjacent said pivot pin and said shoe means restrained against transverse movement relative to said base member is disposed adjacent the tool mounting end of said tool support.

References Cited by the Examiner

UNITED STATES PATENTS 3,051,029 8/1962 Cushman et al. _____ 82—36
3,190,152 6/1965 Werth.

FOREIGN PATENTS 143,190 8/1903 Germany.

WILLIAM W. DYER, Jr., *Primary Examiner.*

LEONIDAS VLACHOS, *Examiner.*